United States Patent
Felby et al.

(10) Patent No.: US 11,306,264 B2
(45) Date of Patent: Apr. 19, 2022

(54) BIOFUEL COMPOSITION COMPRISING LIGNIN

(71) Applicants: A.P. MØLLER—MÆRSK A/S, Copenhagen K (DK); KØBENHAVNS UNIVERSITET, Copenhagen K (DK)

(72) Inventors: Claus Felby, Veksø (DK); Stefan Mayer, Frederiksberg (DK); Yohanna Cabrera Orozco, Holbæk (DK)

(73) Assignees: A.P. MØLLER—MÆRSK A/S, Copenhagen K (DK); KØBENHAVNS UNIVERSITET, Copenhagen K (DK)

( * ) Notice: Subject to any disclaimer, the term of this patent is extended or adjusted under 35 U.S.C. 154(b) by 0 days.

(21) Appl. No.: 16/969,480

(22) PCT Filed: Feb. 18, 2019

(86) PCT No.: PCT/EP2019/053969
§ 371 (c)(1),
(2) Date: Aug. 12, 2020

(87) PCT Pub. No.: WO2019/158752
PCT Pub. Date: Aug. 22, 2019

(65) Prior Publication Data
US 2020/0399549 A1    Dec. 24, 2020

(30) Foreign Application Priority Data
Feb. 16, 2018  (DK) .......................... PA 2018 70095

(51) Int. Cl.
*C10L 1/02*     (2006.01)
*C10L 10/12*    (2006.01)
*C08H 7/00*     (2011.01)

(52) U.S. Cl.
CPC .................. *C10L 1/02* (2013.01); *C08H 6/00* (2013.01); *C10L 10/12* (2013.01);
(Continued)

(58) Field of Classification Search
CPC ........... H04N 1/32363; H04N 1/32368; H04N 1/32379; H04N 1/33323; H04N 1/33338;
(Continued)

(56) References Cited

U.S. PATENT DOCUMENTS 1,856,567 A    5/1932  Kleinert et al.
3,585,104 A    6/1971  Kleinert
(Continued)

FOREIGN PATENT DOCUMENTS

CN      1318622 A       10/2001
WO      WO 96/10067     4/1996
(Continued)

OTHER PUBLICATIONS

International Search Report dated Apr. 16, 2019 from corresponding International Patent Application No. PCT/EP2019/053969 (3 pages).
(Continued)

*Primary Examiner* — Ellen M McAvoy
*Assistant Examiner* — Chantel L Graham
(74) *Attorney, Agent, or Firm* — EIP US LLP (57) ABSTRACT

A biofuel composition and a process for the manufacture of a biofuel composition including lignin and ethanol as the main combustible components of the biofuel composition and having total ash below 1% w/w based on total mass of dry matter in the biofuel composition.

25 Claims, 4 Drawing Sheets

(52) U.S. Cl.
CPC ... *C10L 2200/0469* (2013.01); *C10L 2290/06* (2013.01); *C10L 2290/544* (2013.01); *C10L 2290/547* (2013.01)

(58) Field of Classification Search
CPC ....... H04N 1/33346; H04N 2201/3335; C08H 6/00; C08L 5/14; C08L 97/005; C10G 1/045; C10L 10/12; C10L 1/02; C10L 2200/0469; C10L 2290/06; C10L 2290/544; C10L 2290/547; D21C 11/0007; D21C 3/20; D21C 3/22
See application file for complete search history.

(56) References Cited

U.S. PATENT DOCUMENTS

| | | | |
|---|---|---|---|
| 4,762,529 | A | 8/1988 | Schulz |
| 5,478,366 | A | 12/1995 | Teo et al. |
| 5,735,916 | A | 4/1998 | Lucas et al. |
| 5,788,812 | A | 8/1998 | Agar et al. |
| 8,852,301 | B1 | 10/2014 | Bootsma |
| 2010/0317070 | A1 | 12/2010 | Agaskar |
| 2013/0060071 | A1 | 3/2013 | Delledonne et al. |
| 2015/0275113 | A1 * | 10/2015 | Bradin ............... C10L 1/14 44/443 |
| 2016/0024712 | A1 | 1/2016 | Smit et al. |
| 2016/0031921 | A1 | 2/2016 | Manesh et al. |
| 2017/0152278 | A1 | 6/2017 | Samec et al. |

FOREIGN PATENT DOCUMENTS

| | | | |
|---|---|---|---|
| WO | WO 2009/116070 A2 | 9/2009 | |
| WO | WO 2010/037178 A1 | 4/2010 | |
| WO | WO 2011/117705 A2 | 9/2011 | |
| WO | WO 2011/131144 A1 | 10/2011 | |
| WO | WO 2013/005104 A2 | 1/2013 | |
| WO | WO 2014/126471 A1 | 8/2014 | |
| WO | WO 2015/080660 A1 | 6/2015 | |
| WO | WO-2015080660 A1 * | 6/2015 | ............ C10G 1/086 |
| WO | WO 2016/023563 A1 | 2/2016 | |
| WO | WO 2017/108055 A1 | 6/2017 | |

OTHER PUBLICATIONS

International Preliminary Report on Patentability and appended Written Opinion dated Aug. 18, 2020 from corresponding International Patent Application No. PCT/EP2019/053969 (9 pages).
Danish Search Report and Opinion dated Jul. 9, 2018 from corresponding Danish Patent Application No. PA 2018 70095 (33 pages).
Danish Search Report and Opinion dated May 21, 2019 from corresponding Danish Patent Application No. PA 2018 70095 (3 pages).
Danish Search Report and Opinion dated Apr. 16, 2020 from corresponding Danish Patent Application No. PA 2018 70095 (3 pages).
De la Torre, M.J. et al., "Organsolv lignin for biofuel", Industrial Crops and Products, 2013, vol. 45, pp. 58-63.
Hansen et al., "Structural and chemical analysis of process residue from biochemical conversion of wheat straw (*Triticum aestivum* L.) to ethanol", Biomass and Bioenergy, vol. 56, 2013, pp. 572-581.
Larsen et al., "Inbicon make lignocellulosic ethanol a commercial reality", Biomass and Bioenergy, vol. 46, 2012, pp. 36-45.
Nielsen et al., "Valorization of lignin from biorefineries for fuels and chemicals", Dissertation for The Degree of Doctor of Philosophy at The Technical University of Denmark Department of Chemical and Biochemical Engineering, DTU Library, (186 pages).
Yohanna Cabrera et al., "Purification of Biorefinery Lignin with Alcohols", Journal of Wood Chemistry and Technology, vol. 36, No. 5, Mar. 1, 2016, (pp. 339-352), XP055576904.

* cited by examiner

Prior Art

BIOFUEL COMPOSITION COMPRISING LIGNIN

This application is a National Stage application of International Application No. PCT/EP2019/053969, filed Feb. 18, 2019, wherein the above-mentioned International Application claims the benefit under 35 U. S. C. § 119(a) of the filing date of Feb. 16, 2018 of Danish Patent Application No. PA 2018 70095, the entire contents of each of which are incorporated herein by reference.

BACKGROUND OF THE INVENTION

Technical Field

The present invention relates to novel biofuel compositions, a process for producing novel, low-cost biofuel compositions, and their use in combustion engines with large tolerances to fuel quality, like for example large, low speed two-stroke engines for the shipping industry.

Background

The production of fuels from biomass (biofuels) has the potential to decrease our dependency on fossil fuels and the environmental impacts stemming therefrom. Biofuels derived from polysaccharides, which comprise 50-70% of the plant biomass are gradually attaining such levels of cost and availability in the global market (e.g. bioethanol from $2^{nd}$ generation fermentation) that slowly biofuels have become of interest to the maritime industry as a means to reduce the heavy dependency on low-grade fossil fuels and associated high environmental loads.

The marine sector is facing a number of challenges in combatting its environmental impact; in particular its dependency on waste oil from the crude oil refining industry with its high contents of sulfuric compounds and badly combustible compounds with propensity for particle sooting. Particle and SOx-emissions can be reduced by switching to low-sulfur (but often more costly) fuels, or by installing on-board scrubbers. However, to substantially reduce or eliminate fossil fuel $CO_2$-emissions, new low-carbon impact fuels, such as biofuels, are needed.

Significant, but interrelated, problems in relation to the use of biofuels in the marine sector, are given by the currently high prices of biofuel compared to shipping fuel, the current general absence of ship engines capable of efficiently utilizing current biofuels, and the longevity of such ship engines, which makes replacement of ancient technology a very slow process.

In general, a biofuel is a fuel or combustible composition that is produced through contemporary biological processes, such as e.g. agriculture, aerobic and/or anaerobic digestion, rather than a fuel produced by geological processes such as those involved in the formation of fossil fuels, such as coal and petroleum, from prehistoric biological matter (Wikipedia). In the context of the present invention, the term biofuel shall be used in accordance with the above definition.

Biofuels can be derived directly from plants, or indirectly from agricultural, commercial, domestic, and/or industrial wastes. Renewable biofuels generally involve contemporary carbon fixation, such as those that occur in plants or microalgae through the process of photosynthesis. Other renewable biofuels are made through the use or conversion of biomass (referring to recently living organisms, most often referring to plants or plant-derived materials). This biomass can be converted to convenient energy-containing substances in several different ways, e.g. thermal conversion, chemical conversion, and/or biochemical conversion with the resulting biofuels being any of solid, liquid or gaseous.

An interesting candidate for a biofuel component in large volumes is lignin, a solid polymer that includes 15-35% of the biomass, up to 30% of non-fossil organic carbon and 20-35% of the dry mass of wood, and is the most energy dense fraction of biomass. The mass fraction of lignin can be even higher in waste biomass from biogas and bioethanol production and can be in excess of 50% w/w of the total dry mass of the biomass. As modern biorefineries generate large amounts of lignin, its valorization is vital for economic profitability of biorefinery processes, and the development of routes for the production of particular liquid fuels comprising lignin is a topic of significant commercial interest and research.

Lignin (a heteropolymer) varies in its exact composition between plant species. In general, it is characterized by a high degree of aromaticity, heterogeneity and lack of a defined primary structure. And, while lignin is present in almost all biomass to a smaller or larger degree, the application described herein relies primarily on plants that are available in very large quantities i.e. from agriculture or forestry, wherein the commercial exploitation hitherto has proven difficult. More often than not, lignin is burned as it is produced, rather than being processed to higher value products such as biofuels.

To obtain lignin for technical processing it is necessary to separate it from the carbohydrates in the plant cell walls. At an industrial scale this is done by chemical or enzymatic/biological processing e.g. by Kraft cooking, in e.g. paper production, enzymatic hydrolysis and/or anaerobic fermentation to biogas, bioethanol, and/or biobutanol. During processing, the structure of the initial, native lignin is modified to a smaller or larger degree, thus lignin is never obtained in a native form, irrespective of the starting material. Throughout the present disclosure, degraded native lignin shall be referred to as processed lignin where necessary and appropriate for distinguishing the processed lignin from its native, biological origin.

Liquid fuels can potentially be obtained from any native lignin. However, this technology is currently delayed by the lack of efficient catalytic technologies for chemical digestion of lignin, or the unfeasibility of upscaling these processes. Conversion strategies to depolymerize native lignin, e.g., pyrolysis or solvolysis, cannot be implemented in a large scale yet, because they require high energy inputs and materials with insufficient yields and high processing costs, severely limiting the economy of utilization.

A significant drawback to current methods of manufacturing biofuels based on isolated lignin is the energy cost and inevitable solvent loss associated with evaporating and separating solvent from lignin to isolate lignin. Another significant problem resulting from current methods of isolating lignin is the depolymerization and partial oxidation of lignin, whereby the energy density of the resulting biofuels is lowered.

A further problem for the efficient utilization of lignin in biofuels is that the biomass fraction comprising lignin isolated in $1^{st}$ and $2^{nd}$ generation ethanol production also comprises large amounts of plant minerals, in particular silicates, which must be removed prior to production of the biofuel comprising lignin. Traditionally, this problem has been overcome by first isolating processed lignin from the biorefinery biomass and subsequently resuspending or liquefying the isolated processed lignin in an alcohol, particularly in ethanol.

Methods of making biofuels including processed lignin have been disclosed e.g. in U.S. Pat. No. 5,735,916, wherein plant minerals are separated from lignin in aqueous suspension at alkaline conditions, followed by drying of lignin and resuspension in ethanol for producing a biofuel comprising lignin. WO 2013005104 reports the production of biofuels comprising lignin, using a continuous flow wood processing technology for extracting lignin, wherein lignin is first isolated and subsequently resuspended to produce a biofuel including lignin. Also WO 2016023563 and WO 2017108055 report the addition of isolated lignin to fuels in order to produce biofuels including lignin. WO 2009/116070 reports the use of chemically digested lignin in biofuels with ethanol, wherein the resulting chemically digested lignin is dissolvable in water and organic solvent.

A particular drawback of the processes including isolation of processed lignin and resuspension in organic solvent, apart from increased energy demands for production, relates to the loss of combustible biomass fractions of other than lignocellulosic origin, such as e.g. waxes, lipids, etc. Such combustible biomass fractions are absent from the biofuels of the prior art.

However, recently work performed in the research group of one of the present inventors (Cabrera et al., Journal of Wood Chemistry and Technology, 2016, vol. 36:5, pp. 339-352) has provided a reliable method of removing ashes from biomasses comprising lignin in a modified organosolv process (10), which has inspired the present inventors to modify the stand of the present technology with the aim of overcoming the drawbacks of the prior art and to provide improved uses for lignin as a biofuel.

Figure 1:
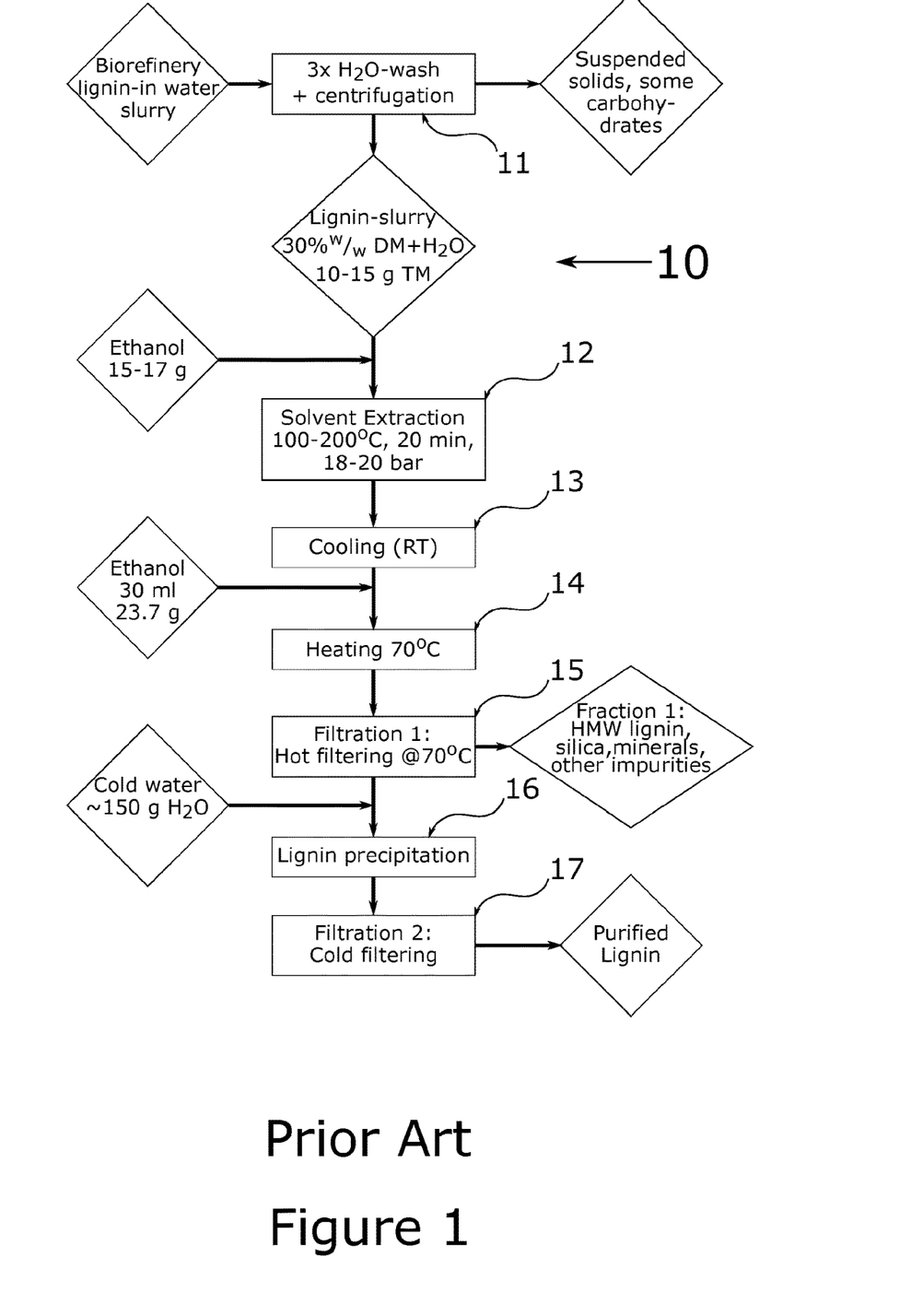
FIG. 1: Prior art—Method of purifying lignin.

The method of Cabrera et al. is detailed in FIG. 1. Herein, aqueous biorefinery lignin-slurries (about 70% w/w water) are subjected to a modified organosolv process in ethanol under relatively mild reaction conditions for removal of ashes, which slurries are subsequently flash-cooled using cold water after ash-removal, which results in precipitation of organosolv lignin having a very low ash content, i.e. below 1% w/w based on dry matter.

Accordingly, there is herein presented a process (20) for the manufacture of a biofuel composition including processed lignin, wherein lignin is in stable dispersion in an organic solvent, and wherein the minerals fraction of the originating lignocellulosic biomass has been removed or significantly reduced, without the need for a process step of isolating lignin from solution. To overcome the challenge of depolymerization, in particular for avoiding complete or full depolymerization, which is costly in production energy, and meet the requirement of liquefaction, colloidal systems with biomass particles (primarily lignin) dispersed in alcohol solutions are herein developed. These systems are based on the property that processed lignin can be dissolved in alcohols at increased temperatures, as ethanol is already available in large quantities and is often co-processed with lignin in biorefineries.

In the context of the present invention, the term biomass lignin shall be understood to represent a short form for the longer, but more accurate, term: a biomass; which has been reduced, or substantially reduced, of water-soluble carbohydrates, hemicelluloses and/or celluloses, prior to its use in the methods and processes of the present invention, and accordingly includes lignin (whether native or processed) as its main fraction with respect to combustible dry mass. Nevertheless, in the context of the present invention, wherein the end-result of the processes and methods described herein is a biofuel composition, it is not in general necessary to accurately define the biomass, which serves as starting point for the same methods and processes, as all carbohydrates which are not removed from the starting biomass for other reasons and purposes, will form combustible constituents of the resulting biofuel compositions. Biomasses including lignin as main mass fraction further comprise further mass fractions of waxes and water-soluble carbon containing residues together with further mass fractions of other biomass polysaccharides. In the context of the present disclosure, biomass lignin shall therefore be understood as biomass comprising lignin as its main mass fraction and further mass fractions derived from lignocellulosic biomass, these minor mass fractions including small and/or large organic molecules, which molecules can be water soluble as well as water insoluble and/or further polysaccharides. In general, biomass lignin is ubiquitous available from agriculture and is well suited for use with the present invention Accordingly, in the context of the present invention, there shall be made a distinction between lignocellulosic biomass, which is used in its common meaning, as plant dry matter including inorganic mass fractions, and biomass lignin which, in accordance with the above definition shall be taken to mean lignocellulosic biomass reduced of, or substantially reduced of, water-soluble carbohydrates, hemicelluloses and/or celluloses. Also, and in consequence thereof, biomass lignin, as it is defined herein, is a subset of the larger group, biomasses comprising lignin.

Also in the context of the present disclosure, there shall be discussed as examples of biomass lignin such sources as hydrolysis or biorefinery lignin, organosolv lignin, vinasse lignin, bagasse lignin, Kraft lignin and/or other sources of biomasses comprising lignin as it major mass component. In general, and while it is preferable to use biorefinery lignin, vinasse lignin, bagasse lignin, biogas lignin, and/or organosolv lignin as starting materials for the production of biofuel compositions according to the present invention, as these lignin sources are characterized by low sulfur-contents, the methods and processes of the invention, however, are not limited to any particular type of source of biomass lignin, but rather all known biomasses comprising lignin can serve as the starting material, but processing parameters may vary in accordance with the origin of the biomass lignin within the limits as given herein.

SUMMARY OF THE INVENTION

In a first aspect and embodiment, the present invention relates to a process (20) for the manufacture of a biofuel composition comprising processed lignin and ethanol as its main combustible components having total ash below 1% w/w based on total mass of dry matter in the biofuel composition, the process including:
  i. providing a slurry comprising ethanol and a biomass comprising lignin as its main combustible component;
  ii. subjecting the slurry to an organosolv extraction (22) at an extraction temperature T1 from 100° C. to 250° C., at an extraction pressure P1 from 10 bar to 60 bar, and for an extraction time t1 not exceeding 24 hours, thereby providing a resulting slurry and a first precipitate;
  iv. separating (25) the resulting slurry of step ii. from the first precipitate; and
  vi. cooling (29) the resulting slurry of step iv. to obtain the biofuel composition.

In a second aspect of the present invention there is disclosed a biofuel composition including ethanol and lignin solubilized and/or dispersed in the ethanol as main combustible mass fractions and comprising not more than 1% w/w of ashes based on total dry mass of the biofuel composition.

DETAILED DESCRIPTION

In a first aspect and embodiment, the present invention relates to a process (20) for the manufacture of a biofuel composition including processed lignin and ethanol as its main combustible components having total ash below 1% w/w based on total mass of dry matter in the biofuel composition, the process including:
  i. providing a slurry including ethanol and a biomass including lignin as its main combustible component;
  ii. subjecting the slurry to an organosolv extraction (22) at an extraction temperature T1 from 100° C. to 250° C., at an extraction pressure P1 from 10 bar to 60 bar, and for an extraction time t1 not exceeding 24 hours, thereby providing a resulting slurry and a first precipitate;
  iv. separating (25) the resulting slurry of step ii. from the first precipitate; and
  vi. cooling (29) the resulting slurry of step iv. to obtain the biofuel composition.

Figure 2:
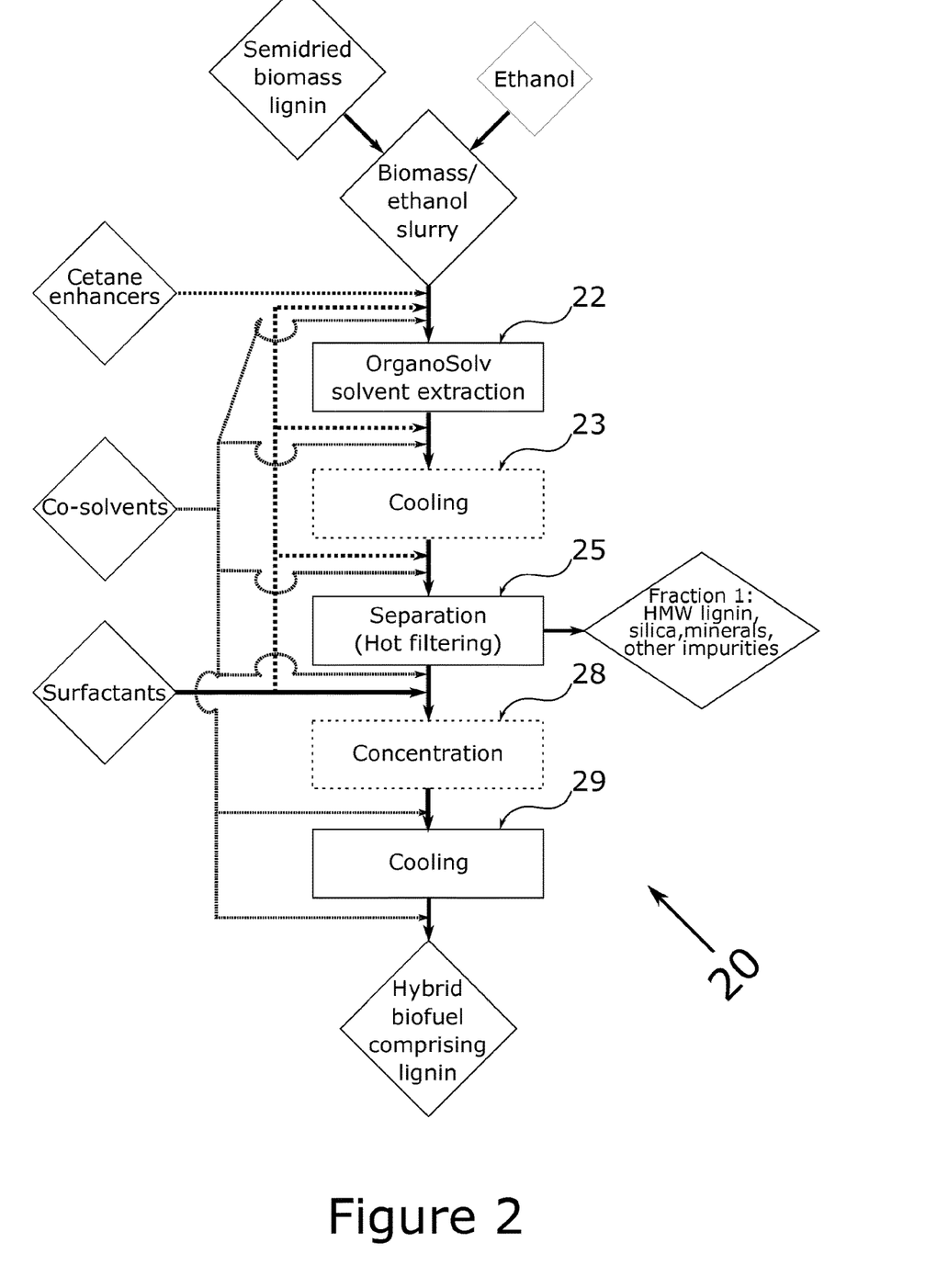
FIG. 2: Flowchart of the process of the invention.

The process of the present invention is schematically detailed in FIG. 2. In the process, biomass comprising lignin (whether native or processed) as its main combustible component is subjected to a relatively mild organosolv extraction which, under the given processing conditions, render the processed biomass now including processed lignin and only negligible amounts of native lignin (if any) suspendable in concentrated solutions of ethanol. This is done in a one-pot process without requiring intermediate isolation of the processed lignin prior to resuspension in ethanol. As a welcome further advantage, the resulting levels of ash are very low compared to the prior art. As a result, the energy required to produce the biofuel is significantly lowered over the processes of the prior art involving isolation of processed lignin and resuspension.

As is detailed in the below experiments, it is an added advantage of the present process, that also when the process of the present invention is used on already processed and isolated lignin, such as e.g. Kraft lignin, organosolv-lignin or Protobind lignin, which are commercially isolated in processes having ash levels usually in excess of 2% w/w based on dry mass of processed lignin, subjecting these processed and isolated lignin to the process of the invention will further reduce the ash levels of these processes lignins. Thereby the biofuels of the present invention will have lower ash-levels by dry mass compared to biofuels obtained by resuspending commercially available processed lignin in ethanol.

According to an embodiment of the process (20), the process further includes a step iii. wherein the resulting slurry and precipitate are cooled (23) prior to separation (25).

According to an embodiment of the process (20), the process further includes a step v. wherein the resulting slurry of step iv. is concentrated (28) by removal of ethanol, preferably concentrated (28) by removal of ethanol until formation of a second precipitate is observed.

According to an embodiment of the process (20), separation (25) is by filtration or centrifugation, preferably filtration, even more preferably hot filtration at a temperature below the boiling point of ethanol at a given pressure, such as e.g. about 5° below the boiling point of ethanol at a given pressure. In the experiments reported herein, filtration was at 70° C., at ambient pressure. Preferably, the resulting slurry is substantially free of precipitate since the precipitate will comprise the major mass fraction of the ashes from the biomass.

According to an embodiment of the process (20), the total ash is not more than 0.5% w/w based on total mass of dry matter in the biofuel composition, preferably not more than 0.4% w/w, and even more preferably not more than 0.3% w/w.

According to an embodiment of the process (20), the biomass comprising lignin comprises less than 20% w/w of water, more preferably less than 10% w/w of water, and even more preferably less than 7.5% w/w of water, based on total mass of the biomass.

According to an embodiment of the process (20), the concentration of biomass in ethanol does not exceed 50% w/w dry matter based on total mass of slurry, 40% w/w dry matter, 30% w/w dry matter, preferably does not exceed 20% w/w of dry matter. According to a further embodiment of the process (20) the concentration of biomass in ethanol is not less than 5% w/w dry matter based on total mass of slurry, preferably not less than 10% w/w dry matter, and even more preferably not less than 15% w/w dry matter based on total mass of slurry.

The experiments of the present inventors have shown that when the concentration of biomass in the slurry exceeds about 50% w/w dry matter based on total mass of slurry, the efficiency of the organosolv extraction process (22) decreases, whereas when the biomass concentration becomes too small, e.g. below 5% w/w, too much ethanol has to be evaporated to achieve resulting concentrations of processed lignin in the resulting biofuel composition of up to 30% w/w, thereby lowering the economic value of the process. Especially, it has to be remembered that about 10-15 mass percent of biomass will be removed from the process when the ashes are filtered out in step iv. of the process (20).

According to an embodiment of the process (20), the organosolv extraction (2) of step ii. is performed in the presence of a catalyst. Yields are thereby increased significantly.

According to an embodiment of the process (20), when the catalyst is present, it is either a base or an acid; preferably, the catalyst is a Lewis acid type catalyst, and more preferably, the catalyst is selected from sodium hydroxide, formic acid or para toluene sulfonic acid (pTSA).

According to an embodiment of the process (20), when a catalyst is present, the catalyst comprised in the resulting slurry of step ii. is neutralized or precipitated prior to the separation of step iv.

According to an embodiment of the process (20), the extraction temperature T1 is from 100° C. to 225° C., preferably from 100° C. to 200° C., even more preferably from 150° C. to 200° C.

According to an embodiment of the process (20), the extraction pressure P1 is from 15 bar to 22 bar, preferably from 18 bar to 20 bar.

In general, as equilibrium between pressure and temperature will exist within the organosolv reaction chamber, selecting a set extraction temperature T1 results in a set extraction pressure P1 and vice versa.

According to an embodiment of the process (20), the extraction time t1 does not exceed 5 hours, does not exceed 4 hours, preferably does not exceed 3 hours, preferably does not exceed 2 hours, preferably does not exceed 1 hour, and even more preferably does not exceed 30 minutes. Generally, extraction times up to 24 hours are possible, and will achieve adequate dissolution and solvation of the biomass lignin, however the present inventors have discovered that reaction times in excess of 5 hours do not provide increased benefits of dissolution or solvation. By adequately selecting values of temperature, pressure and catalyst as illustrated in the experiments below, the organosolv extraction can be driven to completion in less than 30 minutes, such as in 20 minutes.

According to an embodiment of the process (20), the extraction temperature T1 is from 150° C. to 200° C., the extraction pressure P1 is from 18 bar to 20 bar, and the extraction time t1 is from 15 minutes to 30 minutes.

According to an embodiment of the process (20), the extraction temperature T1 is 200° C., the extraction pressure P1 is 18 bar, and the extraction time t1 is 20 minutes.

The modified organosolv extraction process disclosed herein successfully accomplishes the objective of stabilizing lignin in ethanol by producing biofuels of processed lignin in ethanol dispersions and/or emulsions that are stable at room temperature. These biofuels can be concentrated until the dry matter content of the biofuels is in excess of 30% w/w dry matter (DM). However, the less concentrated biofuels become unstable when the storage temperature is lowered, such as when the storage temperature is lowered to 5° C. and biomass start to precipitate out of dissolution.

Surprisingly, the present inventors have discovered that the addition of small amounts of surfactants significantly increase the amount of processed lignin, which can be stably included in ethanol, and even remain stable also under conditions of refrigeration at 5° C. In particular, the present inventors have discovered that surfactants active by surfactant adsorption at the lignin surface are particularly suitable, particularly nonionic surfactants proved more effective for the stabilization of biomass lignin in ethanol. The experimental data were found to be consistent with the resulting biofuel compositions being at least partial dispersions of biomass in ethanol, potentially even emulsions, below 20% w/w to 30% w/w, and slurries at higher concentrations. In general, surfactants were most efficient at stabilizing the biofuel compositions when the lignin concentration was about 20% w/w or below. More concentrated solutions were observed to be capable of self-stabilization. The experimental data was consistent with the self-stabilization having, at least in part, a contribution from intermolecular lignin-lignin association.

Accordingly, in an embodiment of the process (20) at least one surfactant is comprised in or added to a slurry of the process.

According to an embodiment of the process (20), the at least one surfactant is added to a slurry of the process not later than just after the separation (25) in step iv.

According to an embodiment of the process (20), the at least one surfactant is a nonionic surfactant, or preferably a nonionic and amphiphilic surfactant, or even more preferably, a nonionic, amphiphilic surfactant comprising repetitive monomeric glycol units.

According to an embodiment of the process (20), the at least one surfactant is selected from SOFTANOL™ 50, SOFTANOL™ 90, SOFTANOL™ 120, SOFTANOL™ 200, LUTSENOL™ AT50, LUTSENOL™ AT80, TERGITOL™ NP9, NOVELL II™ TDA 6.6, NOVELL II™ TDA 8.5, BRIJ™ 35, BRIJ™ 56, BRIJ™ 97, BRIJ™ 98, and PLURON 1C™ F68, BEROL™ 08, TWEEN™ 80, TWEEN™ 20, TWEEN™ 80, TRITON™ X-100, TRITON™ X-114, AGRIMUL™ NRE 1205, hydrophobically modified ethylene oxide co-polymer, and/or poly-ethylene glycol (PEG) having a molecular weights from 300 to 20000 Dalton, preferably from 1000 to 10000 Dalton.

According to an embodiment of the process (20), the at least one surfactant is selected from surfactants comprising repetitive ethylene oxide or glycol units, even more preferred the at least one surfactant is selected from surfactants of poly-ethylene glycol or Tween.

In an embodiment of the biofuel composition, the at least one surfactant is selected according to any combination of the above embodiments.

According to an embodiment of the process (20), the concentration of the at least one surfactant in the biofuel composition is from 0.001% to 10% w/w based on total mass of biofuel composition; preferably the concentration is from 0.01% to 5% w/w, even more preferably from 0.1% to 1% w/w, and most preferably the concentration is 0.5% w/w of surfactant based on total mass of biofuel composition.

According to an embodiment of the process (20), the at least one surfactant is added in a first amount prior to the separation step (25) and in a second amount immediately after the separation step (25).

Although adding all of the at least one surfactant immediately after the separation step (25) is fully sufficient to achieve very high lignin loads in the resulting biofuel composition, in excess of 30% w/w based on total mass of biofuel composition, it is however possible to increase this load if some surfactant is added before and/or after the organosolv extraction (22). Care must then be taken, however, to select a surfactant or surfactants, which can resist the organosolv extraction conditions. One such surfactant is a PEG-based surfactant as detailed above. Preferably, the organosolv extraction resistant surfactant is complemented by a second surfactant added immediately after the separation step (25), such as a tween-based surfactant added immediately after the separation step.

According to an embodiment of the process (20), at least one cetane enhancer is added prior to the organosolv extraction (22) of step ii. When biogas lignin is used, some residual degradation product amines, which can serve as cetane enhancers, are naturally present in the biomass.

According to an embodiment of the process (20), at least one co-solvent is included in the biofuel composition. The at least one co-solvent can be added at all stages at the process (20) depending on a required end goal or be present in the initial provided slurry. The use of e.g. long-chain alcohols, such as e.g. octanol or nonanol as co-solvent can be advantageous in order to increase the hydrophobicity of the products where necessary, if a biofuel composition having a specific resulting hydrophobicity is required.

A particularly interesting co-solvent for addition is glycerol, which is available in large surpluses from biodiesel production, and is a preferred co-solvent in relation to the present invention. When glycerol is added as a co-solvent, it can be present in amounts from 5% to 30% w/w based on the amount of processed lignin in the biofuel, preferably from 10% to 20% w/w. Preferably, glycerol is added to the biofuels in the processes detailed herein after the step of separating the resulting slurry from the first precipitate (step iv) to avoid loss of glycerol during separation. However, some glycerol can be present during the organosolv extraction of step ii. When present during this step it may co-react and oligomerize to form shorter oligoglycerols, which have beneficial effects as surfactants for the processed lignin, c.f. the discussion of the beneficial effects of increase solubility from certain surfactants on processed lignin in ethanol.

A particular issue in providing biomass for biofuels is the ubiquitous presence of water in biomass, both as intrinsic water (i.e. water associated intrinsically with the biomass at a molecular level) and extrinsic water which can be removed by e.g. by mechanical means such as applying pressure to the biomass, centrifugation etc., thermal means such as e.g. heating or cooling (freezing), or combinations thereof. A particularly suitable method for reducing the water content of the biomass is ethanol extraction, since water is more strongly associated with ethanol than with the biomass. The ethanol used in the extraction process can afterwards be regenerated in simple manner using e.g. distillation.

In the context of the present invention, it is therefore contemplated that the biomass lignin used as a starting material for the process (20) of the present invention shall be semidried, i.e. that the total water content (intrinsic and extrinsic) shall not exceed 20% w/w water based on total mass of biomass lignin. Preferably, the water content is lower, as in general, the lower the water content, the better the fuel value of the biomass lignin and the resulting biofuel composition. Preferably, the total water content shall not exceed 15% w/w, more preferably 10% w/w, more preferably 7.5% w/w, or even more preferably, 5% w/w of water based on total mass of biomass lignin. Throughout the present disclosure, biomass lignin having a total water content (intrinsic and extrinsic) not exceeding 20% w/w water based on total mass of biomass lignin shall collectively be considered as semidried biomass lignin. The use of dried or semidried biomass lignin is preferred.

Nevertheless, our experiments have shown that it is possible to carry up to 60% w/w of water based on total mass of biomass lignin through the process (20) of the invention and still obtain the benefits of the invention. However, it is then necessary to reduce the water content after isolation of the biofuel composition of the invention, which can be more costly than reducing it prior to the biomass entering the process (20) of the invention. This is nevertheless still possible using conventional means known to the skilled person, e.g. by ethanol extraction as already mentioned.

The present inventors have observed that some water in the semidried biomasses is advantageous in order to carry water-soluble components from the lignin fractions into the ethanol during production of the biofuel composition of the invention, but the amount of water must be adjusted subsequently to meet appropriate standards for fuels, in particular marine fuels, e.g. if the biofuel composition of the present invention shall find use in the shipping industry. However, reducing the water content in the resulting biofuel compositions can be accomplished by conventional means as known in the art.

In preferred embodiments of the present invention, however and in order to save energy, the slurry comprising ethanol and a biomass including lignin as its main combustible component, is a biomass in ethanol slurry, i.e. a slurry whose liquid component is predominantly ethanol, such as 60% ethanol by weight, 70% ethanol, 75% ethanol, 80% ethanol, 85% ethanol, 90% ethanol, 93% ethanol, or 96% ethanol by weight.

According to the preferred embodiment of the process (20) of the invention, ethanol and biomass lignin using a modified organosolv treatment are processed in a pressurized reactor at extraction temperatures between 150-200° C. for 20 minutes to 4 hours. The reaction can be catalyzed with bases like sodium hydroxide, or acids such as preferably a Lewis acid type catalyst, or more preferably, formic acid or para toluene sulfonic acid (pTSA). The catalyst can subsequently be removed, or can remain fully or partially in the resulting lignin; wherefore the catalyst and its dose will depend on the specifications of the desired oil. The reactions can occur uncatalyzed as well. The yields depend mainly on the characteristics of the initial lignin, catalyst type and dose, temperature, and water content.

In a second aspect of the present invention there is disclosed a biofuel composition including ethanol and processed lignin solubilized and/or dispersed in the ethanol as main combustible mass fractions and including not more than 1% w/w of ashes based on total dry mass of the biofuel composition.

In an embodiment of the biofuel composition, the biofuel composition includes not more than 0.5% w/w, preferably not more than 0.4% w/w, more preferably not more than 0.3% w/w, even more preferably not more than 0.2% w/w, and even more preferably not more than 0.1% w/w of ashes based on total dry mass of the biofuel composition.

In an embodiment of the biofuel composition, the biofuel composition includes processed lignin in a concentration from 3% w/w to 60% w/w of lignin, from 5% w/w to 55% w/w of lignin, from 7% w/w to 50% w/w of lignin, from 10% w/w to 40% w/w of lignin, from 13% w/w to 40% w/w of lignin, from 15% w/w to 40% w/w of lignin, from 20% w/w to 40% w/w of lignin, from 25% w/w to 40% w/w of lignin, preferably from 28% w/w of to 38% w/w lignin, and more preferably from 30% w/w of to 35% w/w lignin based on total mass of the biofuel composition.

In an embodiment of the biofuel composition, the biofuel composition includes at least one surfactant at a concentration of said at least one surfactant in the biofuel composition from 0.001% to 10% w/w of surfactant; preferably from 0.01% to 5% w/w of surfactant, more preferably from 0.1% to 1% w/w of surfactant, and even more preferably 0.5% w/w of surfactant based on total mass of the biofuel composition.

In an embodiment of the biofuel composition, the at least one surfactant is a nonionic surfactant, or preferably a nonionic and amphiphilic surfactant, or even more preferably, a nonionic, amphiphilic surfactant comprising repetitive monomeric glycol units.

In an embodiment of the biofuel composition, the at least one surfactant is selected from at least one of SOFTANOL™ 50, SOFTANOL™ 90, SOFTANOL™ 120, SOFTANOL™ 200, LUTSENOL™ AT50, LUTSENOL™ AT80, TERGITOL™ NP9, NOVELL II™ TDA 6.6, NOVELL II™ TDA 8.5, BRIJ™ 35, BRIJ™ 56, BRIJ™ 97, BRIJ™ 98, and PLURON 1C™ F68, BEROL™ 08, TWEEN™ 80, TWEEN™ 20, TWEEN™ 80, TRITON™ X-100, TRITON™ X-114, AGRIMUL™ NRE 1205, hydrophobically modified ethylene oxide co-polymer, and/or poly-ethylene glycol (PEG) having a molecular weights from 300 to 20000 Dalton, preferably from 1000 to 10000 Dalton.

In an embodiment of the biofuel composition, the at least one surfactant is selected from at least one surfactant comprising repetitive ethylene oxide or glycol units, even more preferred the at least one surfactant is selected from at least one surfactant of poly-ethylene glycol or Tween.

In an embodiment of the biofuel composition, the at least one surfactant is selected according to any combination of the above embodiments.

In an embodiment of the biofuel composition, the biofuel composition includes less than 10% w/w of water, preferably less than 7.5% w/w of water, more preferably less than 5% w/w of water, and even more preferably less than 3% w/w of water based on total mass of the biofuel composition. When using biobased ethanol the mass fraction of water is about 4% w/w, which in combination with the intrinsic water comprised with native lignin, yields resulting water contents in the biofuels, which can be higher than 7.5% w/w of water. Accordingly, for preparing biofuel compositions according to the process of the present invention having a water content of about 7.5% w/w of water or lower, subsequent water removal after biofuel isolation in step vi. is normally required.

In an embodiment of the biofuel composition, the biofuel composition includes a co-solvent as detailed herein above.

The concentration of surfactants in the resulting biofuel composition of the process (20) of the invention is preferably from 0.001% to 10% w/w based on total mass of biofuel composition. Preferably, the concentration is from 0.01% to 5% w/w, even more preferably 0.1% to 3% w/w, and most preferably, 0.5% w/w to 1.0% w/w of surfactant based on total mass of biofuel composition.

The biofuel composition may be supplemented with one or more cetane enhancers such as but not limited to 2-ethylhexyl nitrate, nitroalkenes, nitrocarbonates and/or peroxides. The lignin itself has a cetane number of about 20 and, as such, will also increase the cetane number compared to pure ethanol.

In experiments it has been shown that the process of the present invention partially or completely solubilize and disperse the biomass lignin in ethanol; thus the obtained biofuel compositions include both dispersed and solubilized lignin as well as further dispersed and solubilized biomasses.

As mentioned, it is a particular drawback of the processes including isolation of processed lignin and resuspension in organic solvent, apart from increased energy demands for production, that loss of combustible biomass fractions of other than lignocellulosic origin, such as e.g. waxes, lipids, etc. is unavoidable. In the biofuels of the present invention, and in particular in the biofuels prepared according to the processes of the present invention, such combustible biomass fractions which are not of lignocellulosic origin can be present in amounts from 0.5% to 5% by weight of total dry mass, but generally can be present in amounts from 1% to 4%, and more generally can be present in amounts from 2% to 3% by weight of total dry mass.

EXAMPLES

The results presented herein below for solubilization respectively dispersion of lignin in low molecular weight alcohols describe results obtained with a biorefinery lignin (main fraction) i.e. a biomass comprising lignin as main fraction sampled either after saccharification or pulping of the biomass' carbohydrates, hemicelluloses and/or cellulose (hydrolysis lignin) or after saccharification and fermentation (vinasse/bagasse lignin).

The objective of the presented experiments were to form a uniform dispersions/solution of biomass lignin in ethanol with up to 30% w/w solids content, stable at 5° C., as measured by a centrifuge test of 1000 rpm/10 min. This was accomplished in two main steps, physical dissolution and fuel preparation.

Semidried biomasses including lignin (main fraction) and minor fractions of waxes and water-soluble carbon containing residues were obtained from three sources, organosolv-lignin and Kraft-lignin from Sigma-Aldrich, soda-lignin (Protobind 1000 lignin) from GreenValue S. A., and biorefinery lignin prepared from wheat straw by thermochemical pretreatment and subsequent enzymatic hydrolysis and fermentation. The ash levels were above 2% w/w according to the producers' product sheets.

All other chemicals were lab grade from Sigma-Aldrich (p-toluene sulfonic acid, pTSA), or VWR International, LLC (95% ethanol) and were used as received.

Biorefinery lignin prepared from wheat straw from Danish grown wheat by a thermochemical pretreatment and subsequent enzymatic hydrolysis and fermentation have been characterized in detail by numerous authors. The biorefinery lignin from a $2^{nd}$ generation bioethanol process using Danish grown wheat as used herein is well represented by results obtained by Larsen et al. (Biomass and Bioenergy vol. 46, 2012, pp. 36-45) and Hansen et al. (Biomass and Bioenergy vol. 56, 2013, pp. 572-581), having a Gross calorific value (DS/EN 14918) of 23 MJ/kg and a Net calorific value of 22 MJ/kg, a Carbon-to-Ash ratio of about 5 with an ash content of about 15% w/w based on dry mass with about 1.3 g/kg sulfur, all at a water content of about 5% w/w of total mass of biomass. On average, the biorefinery lignin used herein comprises 60-70% w/w lignin, 20-30% w/w ashes, 3-7% w/w further organic components (primarily proteins and hemicellulose), and 3-7% w/w water based on total mass of the biorefinery lignin. The water is intrinsically bound and cannot be released by mechanical treatment of the biorefinery lignin. As mentioned, in the context of the present disclosure, the term semidried biomass lignin can be used to describe the biomass lignin of the experiments.

Preparation of a Biofuel Composition Comprising Lignin:

Example 1

In accordance with the present invention, semidried biomass lignin was mixed with ethanol to form a biomass/ethanol slurry having a dry matter content from 6 to 15% w/w based on total mass of the slurry.

Using a modification of the method (10) of Cabrera et al. (Journal of Wood Chemistry and Technology vol. 36:5, 2016, pp. 339-352) ashes in lignin isolated from biorefinery lignin were reduced to negligible amounts, i.e. significantly below 1% w/w ash based on total dry mass the resulting biofuel composition.

In accordance with the present invention and the process (20) disclosed herein, 120 ml biomass/ethanol slurry was treated in a first step (22), to an organosolv-extraction under 18 bar pressure, at 200° C. for 20 min in the presence of from 0.4 to 0.5 mg p-toluene sulfonic acid, pTSA, per gram slurry. Subsequently the slurry was cooled (23) to about 70° C., the pressure released, and hot filtered (25) at atmospheric pressure. This removed the vast majority of inorganic material (and some minor amounts of high-molecular weight ligneous material). The resulting slurry had a dry matter content of between 6 to 15% w/w based on total mass of the slurry when the starting slurry comprised between 8 to 17% w/w of biorefinery lignin.

In Table 1 is shown the contents of Klason lignin to ash before and after organosolv extraction and filtration and in Table 2 is shown the detected amounts of inorganic components (adapted from Cabrera et al. 2016):

TABLE 1

Compositional analysis of biorefinery lignin samples prior (fraction 1) and after (fraction 2) to ethanol organosolv treatment at 200° C., wherein 1:8, 1:5, and 1:3 represent different solid to liquid ratios (n.d. = not detected). Each data represent the average of two samples analyzed in triplicates. Standard deviations varied between 0.00 and 0.5.

| Sample | | Klason lignin (%) | Ash (%) | Galactan (%) | Glucan (%) | Xylan (%) | Mannan (%) | Mass balance (%) |
|---|---|---|---|---|---|---|---|---|
| Solid fraction of the slurry | | 76 | 14 | n.d. | 1.6 | 1.1 | 0.7 | 93 |
| Fraction 1 | 1:8 | 67 | 24 | 0.4 | 1.4 | n.d. | 0.2 | 92 |
|  | 1:5 | 66 | 24 | 0.4 | 1.4 | n.d. | 0.2 | 92 |
|  | 1:3 | 69 | 25 | 0.4 | 1.4 | n.d. | 0.2 | 97 |
| Fraction 2 | 1:8 | 87 | 0 | n.d. | n.d. | n.d. | 0.1 | 85 |
|  | 1:5 | 90 | 0 | n.d. | n.d. | n.d. | 0.1 | 89 |
|  | 1:3 | 87 | 0 | n.d. | n.d. | n.d. | 0.1 | 86 |

TABLE 2

Elemental analysis of samples prior (fraction 1) and after (fraction 2) ethanol organosolv treatment at 200° C., wherein 1:8, 1:5, and 1:3 represent different solid to liquid ratios. Each data represent the average of two samples analyzed in triplicates.

| Sample | | | | | | | | | | | | |
|---|---|---|---|---|---|---|---|---|---|---|---|---|
|  | Al µg/g | | Ca µg/g | | Fe µg/g | | K µg/g | | Na µg/g | | Si µg/g | |
| Fraction | 1 | 2 | 1 | 2 | 1 | 2 | 1 | 2 | 1 | 2 | 1 | 2 |
| Slurry | 336 |  | 4711 |  | 1627 |  | 340 |  | 815 |  | 44287 |  |
| 1:8 | 574 | n.d. | 7272 | n.d. | 2410 | 592 | 539 | 153 | 278 | 60 | 54923 | 194 |
| 1:5 | 622 | n.d. | 7607 | n.d. | 2449 | 532 | 559 | 108 | 296 | 316 | 55570 | 90 |
| 1:3 | 604 | n.d. | 7612 | n.d. | 2381 | 489 | 671 | 111 | 429 | 67 | 59887 | 110 |

The resulting ash-content was on the order of 800-900 µg/g dry matter (DM) without oxygen and about 2-3 mg/g DM with oxygen, i.e. significantly below 1% w/w total ash based on total dry matter.

In a further process step, 0.5% w/w Tween80 based on total dry mass of slurry was added to the hot filtered slurry and mixed in by vigorously shaking the mixture. The resulting mixture appeared homogenous and dispersion-like. Finally, the slurry was concentrated (28) by slow evaporation of ethanol at 60° C. for 5 hours under stirring to test the level at which precipitation would occur, followed by cooling (29) to 5° C. in a refrigerator.

Figure 3:
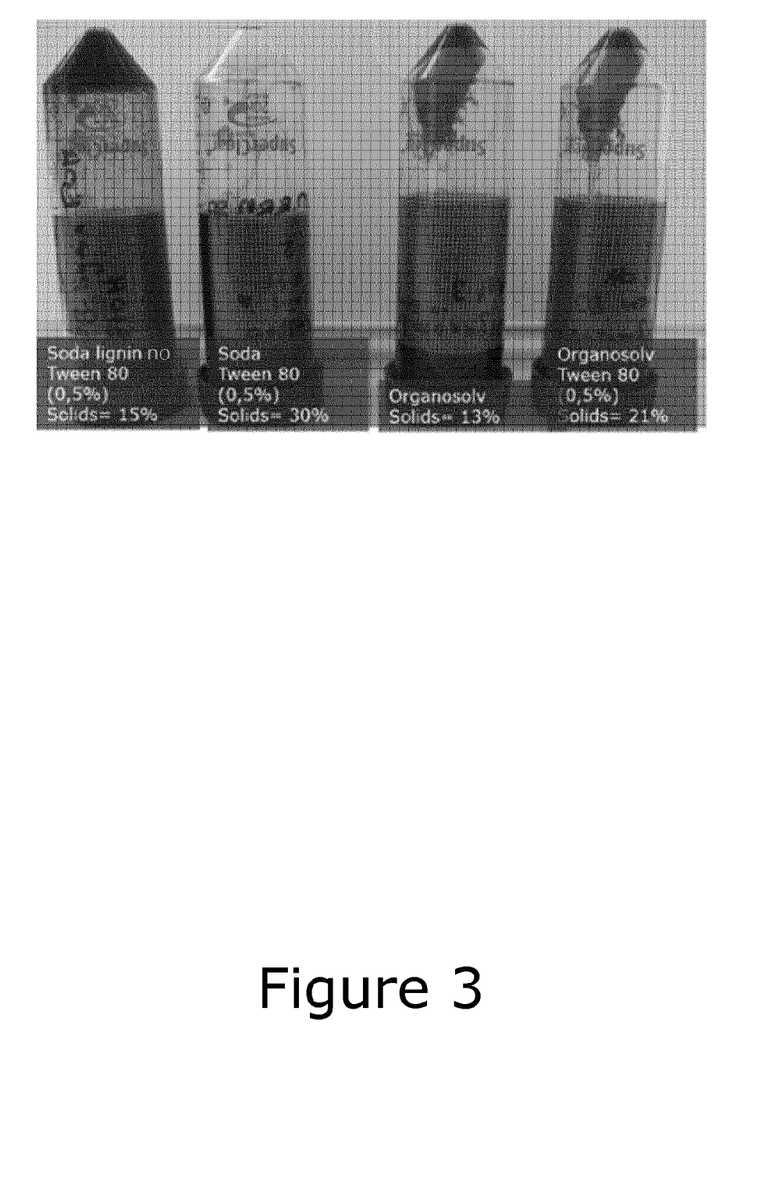
FIG. 3: Biofuel compositions of the invention with and without Tween80.

FIG. 3 and Table 3 show the results for the concentrated biofuel composition.

TABLE 3

Dry matter content of lignin dispersions after concentration to precipitation. Each value represents the average of 4 samples. It was observed that organosolv lignin from Sigma-Aldrich could not be concentrated as much as the soda lignin from Sigma-Aldrich and the biorefinery lignin based on Danish grown wheat straw.

| Lignin Type | Dry matter content % After solvent evaporation |
|---|---|
| Soda lignin | 15 |
| Soda lignin - Tween80 | 30 |
| Biorefinery lignin | 15 |
| Biorefinery lignin - Tween80 | 30 |
| Sigma organosolv lignin | 13 |
| Sigma organosolv lignin - Tween80 | 21 |

The resulting hybrid biofuel compositions were found (at the time of filing the priority disclosure) to have remained stable in refrigerator at 5° C. with no further precipitation for at least 9 months, as measured by a centrifuge test of 1000 rpm/10 min.

Example 2

In a series of further experiments, the effect of surfactants on the stability of the biofuels of the invention were tested using Kraft-lignin, soda-lignin, and two different biomass lignins obtained from two separate hydrothermal enzymatic lignin preparations. As surfactants were chosen Tween80 having a HLB-value of 15 (amphiphilic) and Hypermer B246SF from Croda with a HLB-value of 6, (lipophilic).

Mixtures 3:0, 2:1, 1:2, and 0:3 with HLB-values of respectively 15, 12, 9, and 6 of the 2 surfactants were tested on 20% DM processed lignin in ethanol at surfactant concentrations of respectively 1% and 3% w/w DM. Additionally the compositions included 0.1% respectively, 0.3% w/w DM of octanol for increasing the surfactant viscosity prior to mixing with the biofuel.

Only the amphiphilic surfactant at HLB 15 (i.e. only Tween80) was found suitable for stabilizing the lignin-ethanol biofuels in accordance with the Example 3

Energy density tests were performed by measuring the higher heating value (HHV) in a calorimeter (Parr Instrument Company, Parr 6400 oxygen bomb calorimeter, Illinois, USA) according to ASTM D240. Cellulose tape (no. 610 from 3M) was used for sealing potential openings for minimization of sample evaporation. Benzoic acid pellets (Parr, Ill., USA) were used as reference. The density of the solution was measured by weighing 2.0 mL of the solution in Eppendorf tubes at 15° C.

The expected calorific value of lignin is about 20 MJ/kg and for ethanol about 27 MJ/kg. It was found that due to excluded volume effects for lignin the higher heating value was always closer to that of ethanol than what could be explained from simple additivity of the expected calorific values. This is highly beneficial in such biofuels.

Samples were tested at 20% w/w, 30% w/w, 40% w/w, and 50% w/w of Kraft-lignin and Protobind 1000 in ethanol. Even at 50% w/w of lignin, the calorific value were comparable to that of pure ethanol, about 26.5 MJ/kg.

A particularly important observation was that while ethanol has a lower per volume energy density (21 MJ/l) than conventional fuels like heavy fuel oil, one liter of solution with 50% DM Protobind 1000 lignin releases 23 MJ/L or a lowering of storage needs by 9.5% per volume energy.

Accordingly, while new ship engines designed to operate with alcohols will require more storage volume to release the same amount of energy, the solutions presented herein will have a relative lower fuel-storage volume-requirement and hence, improved cargo capacity on ships running the biofuels of the present invention.

Example 4

The dynamic viscosity of the biofuels of the invention were determined using a rotational viscometer (Brookfield RVDV-II+Pro Viscometer, equipped with a Brookfield SC4-21 Thermosel spindle and a SC4-13R sample chamber with included water jacket). A 7 ml sample is loaded into the sample chamber, where the spindle is inserted. The temperature is measured inside the sample chamber before taking viscosity readings. The sample temperature can controlled by circulating water through the water jacket using a temperature controlled water bath. Samples were tested at 20% w/w, 30% w/w, 40% w/w, and 50% w/w of Kraft-lignin and Protobind 1000 in ethanol.

Figure 4:
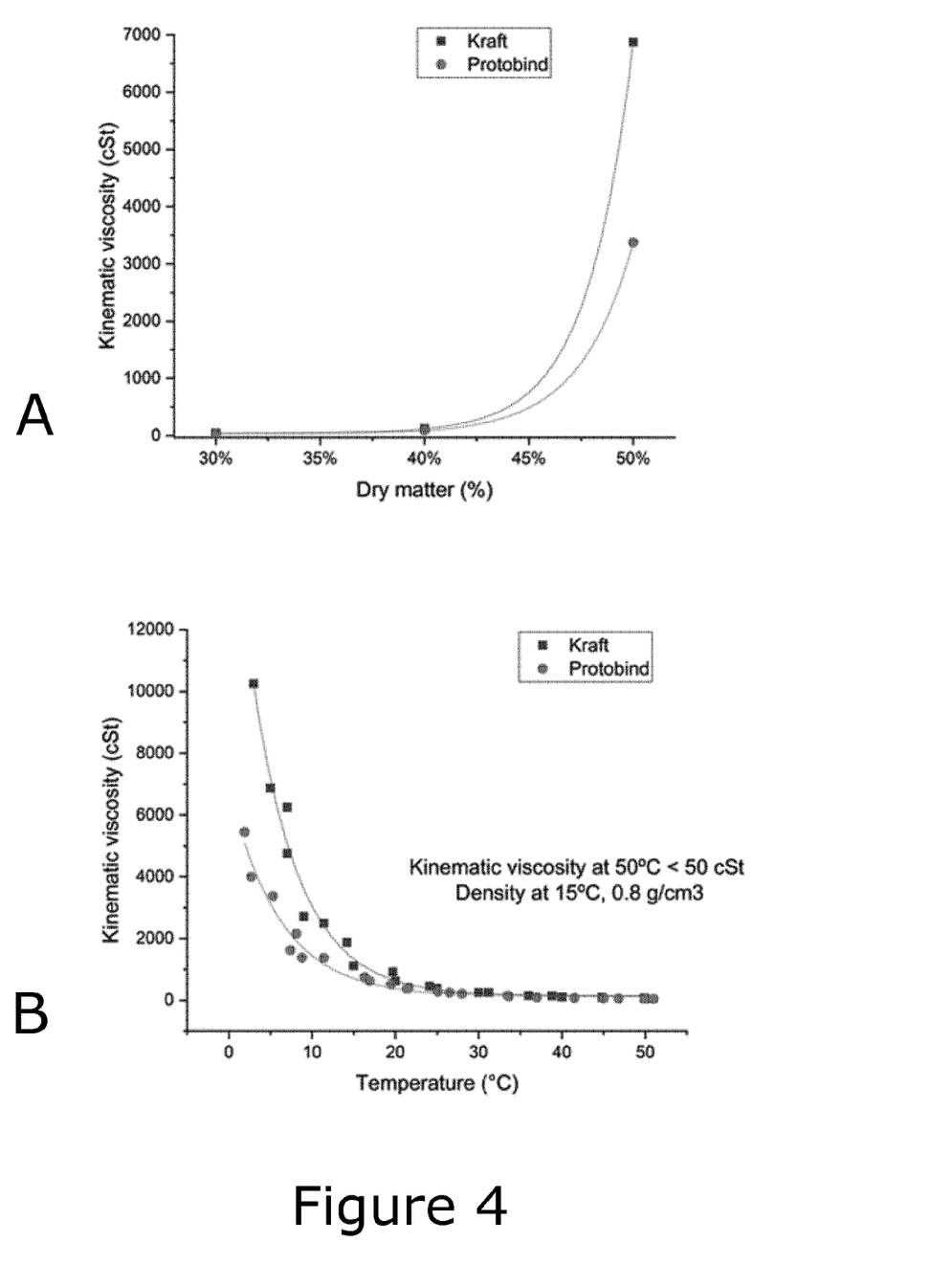
FIG. 4: Viscosity of biofuel compositions of the invention.

In a first experiment at 5° C., the data showed that below 40% w/w lignin the kinematic viscosity remained low (below 200 cSt), whereas the value was larger by at least a factor of 15 (above 3000 cSt) at 50% w/w of lignin, indicating intermolecular lignin association (FIG. 4A).

In a second experiment, at constant dry mass (50% w/w) lignin it was found that at temperatures above about 30° C., the influence of the indicated intermolecular association of lignin on the viscosity vanishes (FIG. 4B).

Such properties are highly desirable in the biofuels of the present invention as these are pumpable at the operating temperatures relevant for ships engines.

Example 5

In a further experiment, the dependency of dry matter content on biofuel stability without surfactant was tested. Samples of Protobind Lignin 1000 initially at 8% DM were concentrated in steps of 1 day as detailed below and subsequently diluted. Protobind 1000 lignin samples, with and without surfactant, were dissolved in ethanol and concentrated to reach DM % of >30%. Then the solutions were re-diluted.

TABLE 4

The stability of the same sample was evaluated at different dry matter contents at 5° C.

| Day | 1 | 2 | 3 | 4 | 5 | 6 |
| --- | --- | --- | --- | --- | --- | --- |
| Dry matter content (%) No-surfactant | Initial 8% Unstable | 10-20% Unstable | 20-30% Super-stable | >30% Super-stable | 20-30% Super-stable | 10-20% Unstable |

It was found that the biofuels could reversibly enter a self-stabilizing concentration range of above 20% DM by concentration and respectively leave the range by dilution. Subsequent concentration would re-establish self-stabilization. When surfactant was added to the unstable solutions, these became stable as expected.

Example 6

Elemental analysis was conducted on biorefinery lignin and Protobind lignin for assessing the suitability of the process for reducing ash-content of the respective lignins.

Multi-elemental analyses of the solid and liquid samples was done using inductively coupled plasma-optical emission spectroscopy (ICP-OES). A sample (10-50 mg) was mixed with 500-2500 μL 70% HNO3, 250-1000 μL 15% H2O2 and 40-200 μL 49% HF, and then digested in a pressurized microwave oven for 10 minutes with a starting pressure of 40 bar and a temperature of 240° C. After digestion, samples were diluted to a final 3.5% acid concentration with Milli-Q water before measurement on an ICP-OES (Model Optima 5300 DV, PerkinElmer) equipped with a HF-resistant sample introduction kit. For quantification, an external 10-point calibration standard P/N 4400-132565 and P/N 4400-ICP-MSCS (CPI International, Amsterdam) was used. A certified reference material (CRM) NCS 73013 Spinach leaf was analyzed together with the samples to evaluate the accuracy and precision of the analysis. Each number represents an average of 4 measurements.

It was found that while the process of the invention was very efficient in reducing silicates levels in the resulting ash to not more than 3% compared to the initial lignin; it was a very welcome result that the sulfur content could be reduced by more than 50% (49% respectively 43% of original maximum) in the de-mineralization process detailed herein. Sulfur reductions at these levels have the propensity for commercializing Kraft-lignin as biofuels in engines.

TABLE 5

| Type | Element | Parental Lignin ppm | s.d | Isolated Lignin ppm | s.d | Reduction* % | Biofuel (20%) ug/L | s.d | ppm |
|---|---|---|---|---|---|---|---|---|---|
| Biorefinery | Al | 336.0 | (7) | 0.0 | ( ) | | 13.2 | (2) | 0.0 |
| | Ca | 4711.0 | (70) | 0.0 | ( ) | | 11.4 | (7) | 0.0 |
| | Na | 815.0 | (39) | 60.0 | (45) | 7 | 4.8 | ( ) | 0.0 |
| | S | 1307.0 | (33) | 641.0 | (149) | 49 | 1602.0 | (122) | 1.6 |
| | Si | 44287.0 | (1326) | 194.0 | (66) | 0 | 197.8 | (25) | 0.2 |
| Protobind | Al | 1064.0 | (37) | 18.0 | (1) | 2 | 7.8 | ( ) | 0.0 |
| | Ca | n.d | ( ) | 51.6 | (12) | | 29.7 | (6) | 0.0 |
| | Na | 7267.0 | (87) | 45.0 | (2) | 1 | 93.0 | (14) | 0.1 |
| | S | 11460.0 | (146) | 4903.0 | (67) | 43 | 1284.8 | (246) | 1.3 |
| | Si | 2367.0 | (73) | 65.0 | (15) | 3 | 46.1 | (12) | 0.0 |
| | V | 1.0 | (1) | 0.0 | ( ) | 3 | 0.5 | ( ) | 0.0 |

*Elemental content in biofuel relative to parental lignin. Elemental analysis of solid lignin samples and liquid LEO fuel. Each number represents the average of four samples; the value in parenthesis is the standard deviation.

CLOSING COMMENTS

The term "comprising" as used in the claims does not exclude other elements or steps. The term "a" or "an" as used in the claims does not exclude a plurality. Although the present invention has been described in detail for purpose of illustration, it is understood that such detail is solely for that purpose, and variations can be made therein by those skilled in the art without departing from the scope of the invention.

The invention claimed is:

1. A process for the manufacture of a biofuel composition comprising processed lignin and ethanol as its main combustible components having total ash below 1% w/w based on total mass of dry matter in said biofuel composition, said process comprising:
   i. providing a slurry comprising ethanol and a biomass comprising lignin as its main combustible component;
   ii. subjecting said slurry to an organosolv extraction at an extraction temperature T1 from 100° C. to 250° C., at an extraction pressure P1 from 10 bar to 60 bar, and for an extraction time t1 not exceeding 24 hours, thereby providing a resulting slurry and a precipitate;
   iv. separating said resulting slurry of step ii. from said precipitate; and
   vi. cooling said resulting slurry of step iv. to obtain said biofuel composition.

2. The process according to claim 1 further comprising a process iii. wherein said resulting slurry and said precipitate are cooled prior to said separating.

3. The process according to claim 1 further comprising a process v. wherein said resulting slurry of process iv. is concentrated by removal of ethanol.

4. The process according to claim 1, wherein said separating is by filtration or centrifugation.

5. The process according to claim 1, wherein a total of ash is not more than 0.5% w/w based on total mass of dry matter in said biofuel composition.

6. The process according to claim 1, wherein said biomass comprising lignin comprises less than 20% w/w of water based on total mass of said biomass.

7. The process according to claim 1, wherein a concentration of biomass in ethanol does not exceed 50% w/w dry matter based on total mass of slurry.

8. The process according to claim 1, wherein said organosolv extraction of process ii. is performed while a catalyst is present.

9. The process according to claim 8, wherein said catalyst is a Lewis acid type catalyst.

10. The process according to claim 8, wherein said catalyst comprised in said resulting slurry of process ii. is neutralized or precipitated prior to said separating of process iv.

11. The process according to claim 1, wherein said extraction temperature T1 is from 100° C. to 225° C.

12. The process-according to claim 1, wherein said extraction pressure P1 is from 15 bar to 22 bar.

13. The process according to claim 1, wherein said extraction time t1 does not exceed 5 hours.

14. The process according to claim 1, wherein said extraction temperature T1 is from 150° C. to 200° C., said extraction pressure P1 is from 18 bar to 20 bar, and said extraction time t1 is from 15 minutes to 30 minutes.

15. The process according to claim 1, wherein at least one surfactant is comprised in or added to a slurry of said process.

16. The process according to claim 1, wherein at least one surfactant is added to a slurry comprised in said process not later than just after said separating in process iv.

17. The process according to claim 1, wherein at least one cetane enhancer is added prior to said organosolv extraction of process ii.

18. A biofuel composition comprising:
   ethanol; and
   processed lignin solubilized and/or dispersed in said ethanol as main combustible mass fractions and comprising not more than 1% w/w of ashes based on total dry mass of said biofuel composition.

19. The biofuel composition according to claim 18, further comprising processed lignin in a concentration from 3% w/w to 60% w/w of lignin based on total mass of said biofuel composition.

20. The biofuel composition according to claim 18, further comprising at least one surfactant at a concentration of said at least one surfactant in said biofuel composition from 0.001% to 10% w/w of surfactant based on total mass of said biofuel composition.

21. The biofuel composition according to claim 20, wherein said at least one surfactant is a nonionic surfactant.

22. The biofuel composition according to claim 18, further comprising at least one combustible biomass fraction which is not of lignocellulosic origin present in amounts from 0.5% to 5% by weight of total dry mass.

23. A biofuel composition comprising a biofuel comprising processed lignin and ethanol as its main combustible components having total ash below 1% w/w based on total mass of dry matter in said biofuel composition, wherein said biofuel is obtained by a process comprising:
  i. providing a slurry comprising ethanol and a biomass comprising lignin as its main combustible component;
  ii. subjecting said slurry to an organosolv extraction at an extraction temperature T1 from 100° C. to 250° C., at an extraction pressure P1 from 10 bar to 60 bar, and for an extraction time t1 not exceeding 24 hours, thereby providing a resulting slurry and a precipitate
  iv. separating said resulting slurry of step ii. from said precipitate; and
  vi. cooling said resulting slurry of step iv. to obtain said biofuel composition.

24. The process according to claim 3, wherein in process v. said resulting slurry of process iv. is concentrated by removal of ethanol until formation of a second precipitate is observed.

25. The process according to claim 8, wherein said catalyst is selected from the group consisting of sodium hydroxide, formic acid, and para toluene sulfonic acid (pTSA).

\* \* \* \* \*